(12) United States Patent
Kim

(10) Patent No.: US 8,777,625 B2
(45) Date of Patent: Jul. 15, 2014

(54) METHOD FOR CREATING COMBINED CHARACTERS IN A CHINESE CHARACTER LEARNING GAME

(76) Inventor: Jin Woo Kim, Seoul (KR)

( * ) Notice: Subject to any disclaimer, the term of this patent is extended or adjusted under 35 U.S.C. 154(b) by 0 days.

(21) Appl. No.: 13/496,320

(22) PCT Filed: Oct. 6, 2010

(86) PCT No.: PCT/KR2010/006813
§ 371 (c)(1),
(2), (4) Date: Mar. 15, 2012

(87) PCT Pub. No.: WO2011/046318
PCT Pub. Date: Apr. 21, 2011

(65) Prior Publication Data
US 2012/0178059 A1   Jul. 12, 2012

(30) Foreign Application Priority Data

Oct. 12, 2009 (KR) .......................... 10-2009-0096558

(51) Int. Cl.
*G09B 19/06* (2006.01)
(52) U.S. Cl.
USPC ......................................... 434/157
(58) Field of Classification Search
CPC ......... G09B 19/06; G06Q 30/00; G06Q 10/00
USPC ......... 434/156, 157, 169, 159, 160; 704/1–10
See application file for complete search history.

(56) References Cited

U.S. PATENT DOCUMENTS

| | | | | |
|---|---|---|---|---|
| 5,529,496 A | * | 6/1996 | Barrett | 434/157 |
| 6,669,562 B1 | * | 12/2003 | Shiino | 463/31 |
| 6,955,602 B2 | * | 10/2005 | Williams | 463/31 |
| 2008/0170788 A1 | * | 7/2008 | Guo | 382/185 |
| 2011/0045447 A1 | * | 2/2011 | Kim | 434/167 |
| 2012/0164607 A1 | * | 6/2012 | Qu | 434/157 |

FOREIGN PATENT DOCUMENTS

| | | |
|---|---|---|
| KR | 20-0272484 Y1 | 4/2002 |
| KR | 20-0341210 Y1 | 2/2004 |
| KR | 20-0384198 Y1 | 5/2005 |
| KR | 10-2006-0033054 A | 4/2006 |
| KR | 10-2006-0045916 A | 5/2006 |
| KR | 10-2006-0057758 A | 5/2006 |
| KR | 10-2007-0016307 A | 2/2007 |
| KR | 10-2007-0060234 A | 6/2007 |
| KR | 10-0829222 B1 | 5/2008 |
| KR | 10-2008-0101687 A | 11/2008 |

OTHER PUBLICATIONS

Mun (KR 10-2007-0060234 A).*

* cited by examiner

*Primary Examiner* — Sam Yao
*Assistant Examiner* — Thomas Hong
(74) *Attorney, Agent, or Firm* — Sughrue Mion, PLLC

(57) ABSTRACT

A method for creating a combined character in a Chinese character learning game includes a first step of creating a portion representing a pronunciation of a combined character as a graphic character; a second step of a portion representing a meaning of the combined character as an additional graphic character(s); and a third step of disposing the graphic character(s) representing the meaning and the graphic character representing the pronunciation according to the positional relationship of the combined character. In the method, a graphic character of the combined character is formed by combining the two or more graphic characters.

20 Claims, 6 Drawing Sheets

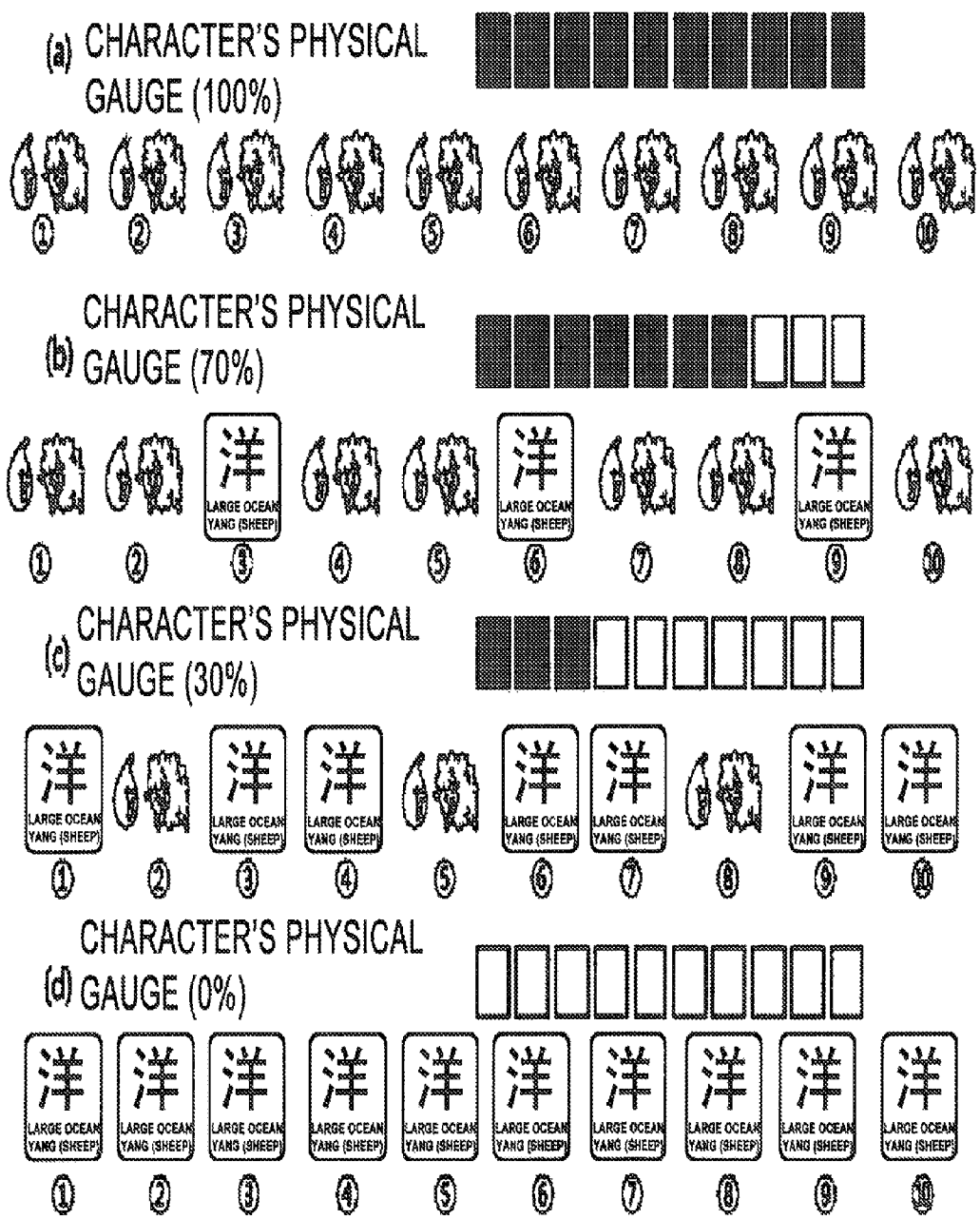

METHOD FOR CREATING COMBINED CHARACTERS IN A CHINESE CHARACTER LEARNING GAME

CROSS REFERENCE TO PRIOR APPLICATIONS

This application is a National Stage Patent Application of PCT International Patent Application No. PCT/KR2010/006813 (filed on Oct. 6, 2010) under 35 U.S.C. §371, which claims priority to Korean Patent Application No. 10-2009-0096558 (filed on Oct. 12, 2009), which are all hereby incorporated by reference in their entirety.

TECHNICAL FIELD

The present invention relates to a method for forming combined characters in a Chinese character learning game, and more specifically, to a method for forming combined characters in a Chinese character learning game, in which a graphic character of a combined character is formed by creating a portion representing a pronunciation of the combined character as a graphic character, creating a portion representing a meaning of the combined character as an additional graphic character(s), and combining the two or more graphic characters, so that it is possible for a learner to easily understand the forming reason or principle of the combined character and to easily recognize the meaning and pronunciation of the combined character according to the operation of the graphic character of the combined character.

BACKGROUND ART

Chinese characters have been created as characters, and the formation of the Chinese characters is generally classified by the Chinese Hexateuch theory. The Chinese characters originally started from hieroglyphic characters, but the Chinese Hexateuch theory could represent concepts or existences that could not be expressed by the hieroglyphic characters, using other methods. That is, the Chinese Hexateuch theory refers to methods of forming Chinese characters using three factors, i.e., shape, pronunciation and meaning. In the Chinese Hexateuch theory, Chinese characters are classified into six categories, i.e., pictogram, ideograph, logical aggregates, pictophonetic compounds, borrowing and associate transformation.

In the Chinese Hexateuch theory, combined characters occupy 90% of 23000 characters recorded in Yukryakseo (Chinese document) published in 12th century, and occupy 97% of 48641 characters in Ganghuijajeon (Chinese dictionary) published in 1716. Generally, 80% of Chinese characters used by Koreans are combined characters, and almost 100% of difficult Chinese characters not used by Koreans are combined characters. The combined characters are formed so that learners can easily understand their meanings and easily pronounce. Hence, if the learners understand the forming reason or principle of the combined characters without unconditionally memorizing the combined characters, the learners can easily learn the combined characters. Thus, the learning ability of the Chinese characters can be quickly increased by understanding the forming reason or principle of the combined characters.

In Korea, Hangul (Korean language) is used in ordinary words, but characters representing their meanings are mostly composed of Chinese characters. As the economy of China is rapidly grown, interest in Chinese characters has been increased. Accordingly, the important of Chinese learning is increased, and there are proposed various methods in which a learner having a learning ability of Chinese characters to a certain level or more can enjoyably learn Chinese characters without any sense of boredom.

Korean Patent Publication No. 10-2007-0060234, entitled by "On-line Chinese character learning game" has been disclosed as a conventional Chinese character learning game. In the game, graphic characters, each of which is created to have an entire outer shape capable of reminding a learner of a Chinese character, are shown in FIG. 1.

Referring to FIG. 1, a first graphic character is created to have the entire outer shape of a heart. In order to provide the learner with a clear feeling 'Love,' the heart-shaped character has a gently smiling figure formed on a front 10a thereof, and has a Chinese character 'love ae (愛)' formed on a rear thereof. A second character is created as a graphic character having an entire outer shape of cloud. Similarly, a figure forming the cloud-shaped character is formed together with the outer shape on a front 20 of the cloud-shaped character, and a Chinese character 'cloud un (雲)' is formed on a rear 20b of the cloud-shaped character.

However, in such a character forming method, the meaning of a Chinese character is simplified as a graphic character, and hence, the learner should learn, one by one, the pronunciation and meaning of a large number of Chinese characters without understanding the forming principle of the Chinese characters. Therefore, the learner has considerable difficulty in learning Chinese characters having strange and complicated shapes, and easily loses interest. Accordingly, the learner does not have a high learning effect of Chinese characters.

DETAILED DESCRIPTION

Technical Problems

It is thus an object of the present invention to provide a method for creating combined characters in a Chinese character learning game performed by characterizing a combined character configured by combining a portion representing a meaning of the combined character and a portion representing a pronunciation of the combined character, in which a combined character is formed by creating a portion representing a meaning of the combined character and a portion representing a pronunciation of the combined character as individual graph characters and disposing the graphic characters according to the positional relationship of the combined character, and the graphic characters are operated according to situations, so that it is possible for a learner to easily understand the forming reason or principle of the combined character through the graphic characters and to easily recognize the meaning and pronunciation of the combined character according to the operation of the graphic character of the combined character.

Technical Solutions

To solve the objective, the present invention provides a method for creating combined characters in a Chinese character learning game through which a user learns Chinese characters, the method including: a first step of creating a portion representing a pronunciation of a combined character as a graphic character; a second step of a portion representing a meaning of the combined character as an additional graphic character(s); and a third step of disposing the graphic character(s) representing the meaning and the graphic character representing the pronunciation according to the positional relationship of the combined character, wherein a graphic character of the combined character is formed by combining the two or more graphic characters.

The present invention also provides a computer-readable recording medium in which a program for creating combined characters in a Chinese character learning game through which a user learns Chinese characters is recorded, the computer-readable recording medium including: a first step of creating a portion representing a pronunciation of a combined character as a graphic character; a second step of a portion representing a meaning of the combined character as an additional graphic character(s); and a third step of disposing the graphic character(s) representing the meaning and the graphic character representing the pronunciation according to the positional relationship of the combined character, wherein a graphic character of the combined character is formed by combining the two or more graphic characters.

Advantageous Effects

Based on the above structure, in the method for creating combined characters in a Chinese character learning game according to the present invention, a combined character is formed by creating a portion representing a meaning of the combined character and a portion representing a pronunciation of the combined character as individual graphic characters, so that it is possible to for a learner to easily understand the forming reason and principle of the combined character and to easily learn, with interest, the meaning and pronunciation of the combined character while performing the game.

Further, it is possible to for the learner to infer which meaning and pronunciation the combined character has through the operation of the graphic characters when the graphic characters make or receive an attack and to easily memorize the combined character by making the combined character as an image.

BRIEF DESCRIPTION OF DRAWINGS

FIG. 7 illustrates a method for operating combined characters in the Chinese character learning game according to a fourth embodiment of the present invention.

BEST MODES FOR PRACTICING INVENTION

Hereinafter, preferred embodiments of the present invention will be described in detail with reference to the accompanying drawings. The following embodiments are provided only for illustrative purposes so that those skilled in the art can fully understand the spirit of the present invention.

A combined character is a Chinese character formed by combining a portion representing a meaning of the combined character and a portion representing a pronunciation of the combined character. Therefore, when a Chinese character is divided into two Chinese characters, i.e., a Chinese character representing its pronunciation and a Chinese character representing its meaning, the Chinese character is referred to as a combined character.

For example, since '洋' (large ocean yang (sheep)) is a Chinese character formed by combining '水' (water drop su) representing a meaning and '羊' (sheep yang) representing a pronunciation, the '洋' (large ocean yang (sheep)) is a combined character. Also, '群' (sheep flock guhn (king)) is a combined character formed by combining '君' (king guhn) representing a pronunciation and '羊' (sheep yang) representing a meaning, and '烈' (fierce yuhl (flames)) is a combined character formed by combining '列' (spread yuhl) representing a pronunciation and '火' (flames hwa) representing a meaning. On the other hand, since '休' (rest hyu) is formed by combining '人' (human ihn) representing a meaning and '木' (tree mok) representing a meaning, the '休' (rest hyu) is not a combined character but an idiographic character.

Figure 1:
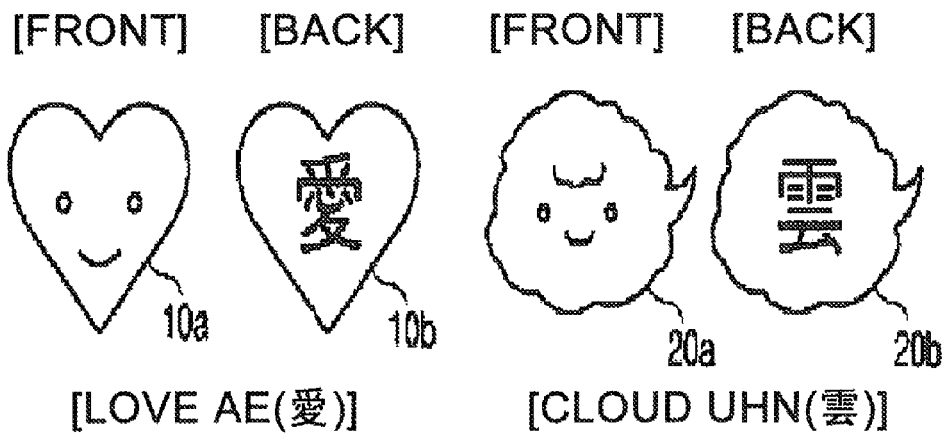
FIG. 1 shows graphic characters in a conventional Chinese character learning game.
Figure 2:
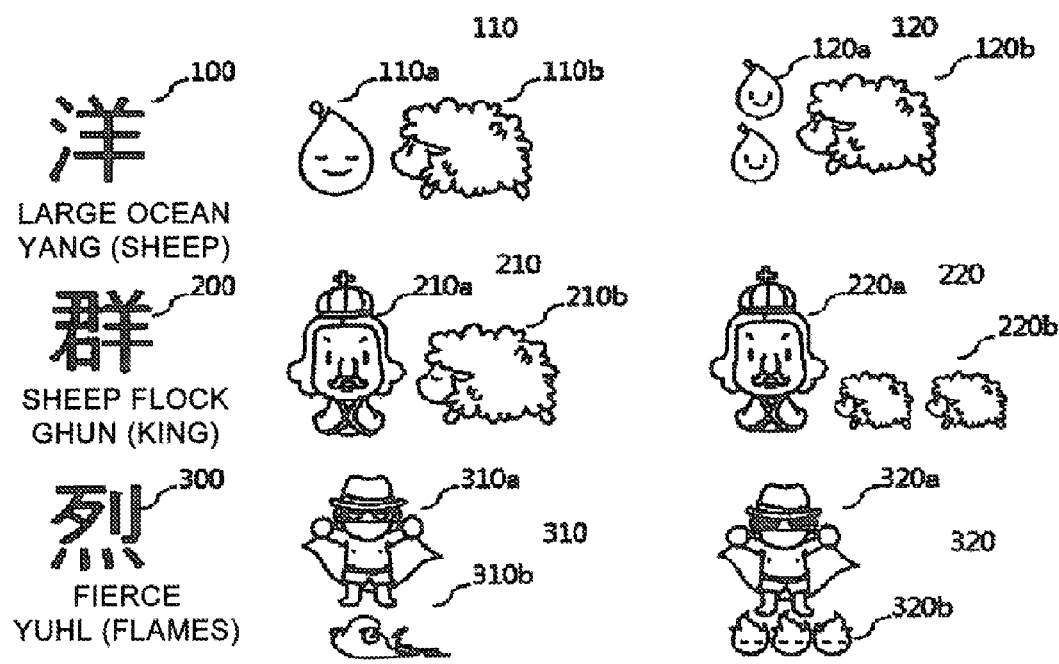
FIG. 2 shows combined characters in a Chinese character learning game according to the present invention.

A method of forming combined characters in a Chinese character learning game according to the present invention will now be described with reference to FIG. 2.

The present invention includes a Chinese character learning game service server system (not shown) for providing services related to a Chinese character learning game that users connected to the Chinese character learning game service server system learn Chinese characters, and a user system (not shown) for receiving contents provided by being connected the Chinese character learning game service server system. A method of creating graphic characters of Chinese characters is performed by a main controller of the Chinese character learning game service server system.

In a combined character '洋' (large ocean yang (sheep)) 100, a graphic character 110 of the '洋' (large ocean yang (sheep)) 100 is formed by creating '水' (water drop su) representing a meaning as a water-drop character 110a, creating '羊' (sheep yang) representing a pronunciation as a sheep character 110b, disposing the water-drop character 110a and the sheep character 110b respectively to the left and right according to the positional relationship of the combined character and then combining the water-drop character 110a and the sheep character 110b. In order to easily distinguish a graphic character representing a pronunciation from a graphic character representing a meaning, the water-drop character 110a representing the meaning is shown in a state in which the water-drop character 110a is sleeping with closed eyes, and the sheep character 110b representing the pronunciation is shown in a state in which the sheep character 110b is awake with open eyes. Various methods are used as a method of distinguish a graphic character representing a pronunciation from a graphic character representing a meaning. For example, the water-drop character 110a representing the meaning may be displayed to have a size different from that of the sheep character 110b representing the pronunciation and/or to be divided into several water-drop characters. Alternatively, the water-drop character 110a representing the meaning may be displayed to have a color different from that of the sheep character 110b representing the pronunciation.

In a combined character '群' (sheep flock guhn (king)) 200, a graphic character 210 of the '群' (sheep flock guhn (king)) 200 is formed by creating '君' (king guhn) representing a pronunciation as a king character 210a, creating '羊' (sheep yang) representing a meaning as a sheep character 210b, disposing the king character 210a and the sheep character 210b respectively to the left and right according to the positional relationship of the combined character and then combining the king character 210a and the sheep character 210b. In this case, the sheep character 210b representing the meaning may be shown in a state in which the sheep character 210b is sleeping with closed eyes, and the king character 210a representing the pronunciation may be shown in a state in which the king character 210a is awake with open eyes. Alternately, the sheep character 210b representing the meaning may be displayed to have a size different from that of the king character 210b representing the pronunciation and/or to be divided into several sheep characters. Thus, the graphic character representing the pronunciation can be easily distinguished from the graphic character representing the meaning.

'烈' (fierce yuhl (flames)) is a combined character formed by combining '列' (spread yuhl) representing a pronunciation and '火' (flames hwa) representing a meaning.

In the combined character '烈' (fierce yuhl (flames)) 300, a graphic character 310 of the '烈' (fierce yuhl (flames)) 300 is formed by creating '列' (spread yuhl) representing a pronunciation as a burberry-man character 310a, creating '火' (flames hwa) representing a meaning as a flame character 310b, disposing the burberry-man character 310a and the flame character 310b respectively to the top and bottom according to the positional relationship of the combined character and then combining the burberry-man character 310a and the flame character 310b. In this case, the flame character 310b representing the meaning may be shown in a state in which the flame character 310b is sleeping with closed eyes, and the burberry-man character 310a representing the pronunciation may be shown in a state in which the burberry-man character 310a is awake with open eyes. Alternately, the flame character 310b representing the meaning may be displayed to have a size different from that of the burberry-man character 310b representing the pronunciation and/or to be divided into several flame characters. Thus, the graphic character representing the pronunciation can be easily distinguished from the graphic character representing the meaning.

Figure 3:
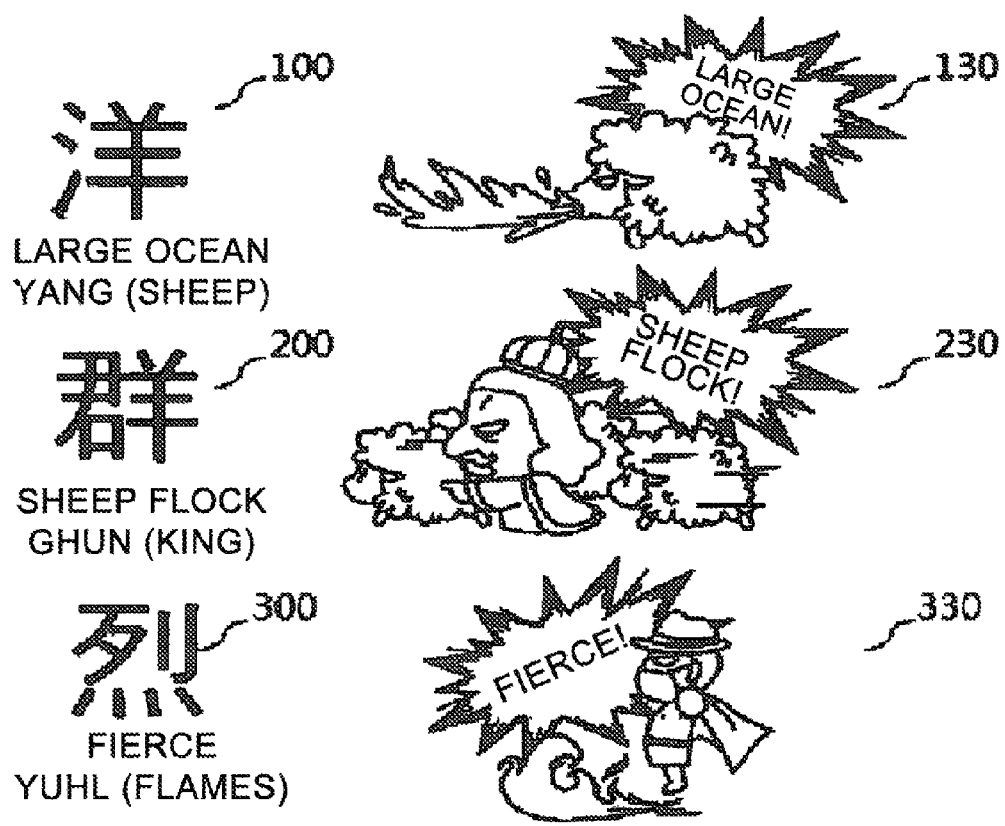
FIG. 3 illustrates a method for attacking combined characters in the Chinese character learning game according to the present invention.

A method of attacking graphic characters of combined characters according to the present invention will now be described with reference to FIG. 3.

When the graphic character 110 of the '洋' (large ocean yang (sheep)) 100 makes an attack to an opponent during a game, the sheep character 110b representing the pronunciation becomes a subject of the attack, and the water-drop character 110a representing the meaning is used as an attribute of the attack (130). Water is spurred from the left of the sheep character 110b. In this case, the sheep character 110b as the subject of the attack is configured to shout 'large ocean' corresponding to the meaning of the combined character in the attack, so that it can be easily recognized that the meaning of the combined character '洋' is large ocean and the pronunciation of the combined character '洋' is 'yang' (sheep).

When the graphic character 210 of the '群' (sheep flock guhn (king)) 200 makes an attack to an opponent during a game, the king character 210a representing the pronunciation becomes a subject of the attack, and the sheep character 210b representing the meaning is used as an attribute of the attack (230). A flock of sheep rush from the right to left of the king character 210a, thereby making an attack. In this case, the king character 210a as the subject of the attack is configured to shout 'sheep flock' corresponding to the meaning of the combined character in the attack, so that it can be easily recognized that the meaning of the combined character '群' is sheep flock and the pronunciation of the combined character '群' is 'guhn' (king).

When the graphic character 310 of the '烈' (fierce yuhl (flames)) 300 makes an attack to an opponent during a game, the burberry-man character 310a representing the pronunciation becomes a subject of the attack, and the flame character 310b representing the meaning is used as an attribute of the attack (330). A fierce flame rises from the bottom to top of the burberry-man character 310a, thereby making an attack. In this case, the burberry-man character 310a as the subject of the attack is configured to shout 'fierce' corresponding to the meaning of the combined character in the attack, so that it can be easily recognized that the meaning of the combined character '烈' is fierce and the pronunciation of the combined character '烈' is 'yuhl' (flames).

A method of operating graphic characters of combined characters according to the present invention will now be described with reference to FIGS. 4, 5, 6 and 7.

Figure 4:
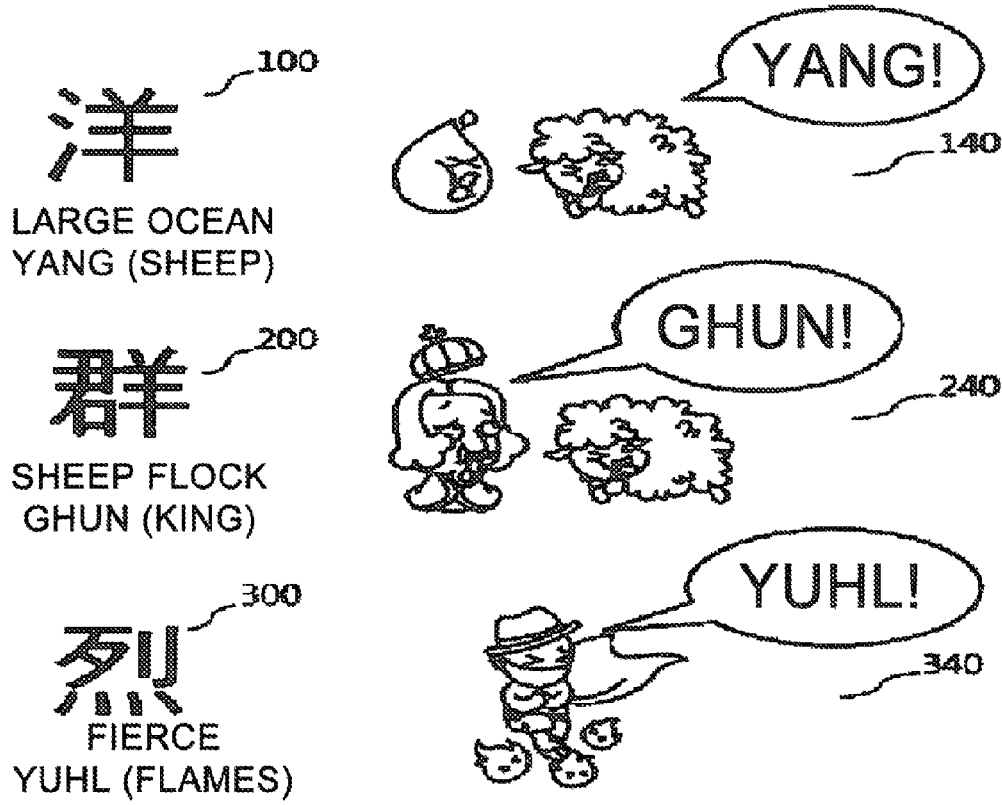
FIG. 4 illustrates a method for operating combined characters in the Chinese character learning game according to a first embodiment of the present invention.

In one embodiment, when the graphic character 110 of the '洋' (large ocean yang (sheep)) 100 receives an attack from an opponent during a game, the sheep character 110b representing the pronunciation is configured to shout 'yang' (sheep) that is the pronunciation of the combined character and to cause an action of flickering or turning to red. Similarly, when the graphic character 210 of the '群' (sheep flock guhn (king)) 200 receives an attack from an opponent during a game, the king character 210a representing the pronunciation is configured to shout 'guhn' (king) that is the pronunciation of the combined character. When the graphic character 310 of the '烈' (fierce yuhl (flames)) 300 receives an attack from an opponent during a game, the burberry-man character 310a representing the pronunciation is configured to shout 'yuhl' (flames) that is the pronunciation of the combined character (FIG. 4).

Figure 5:
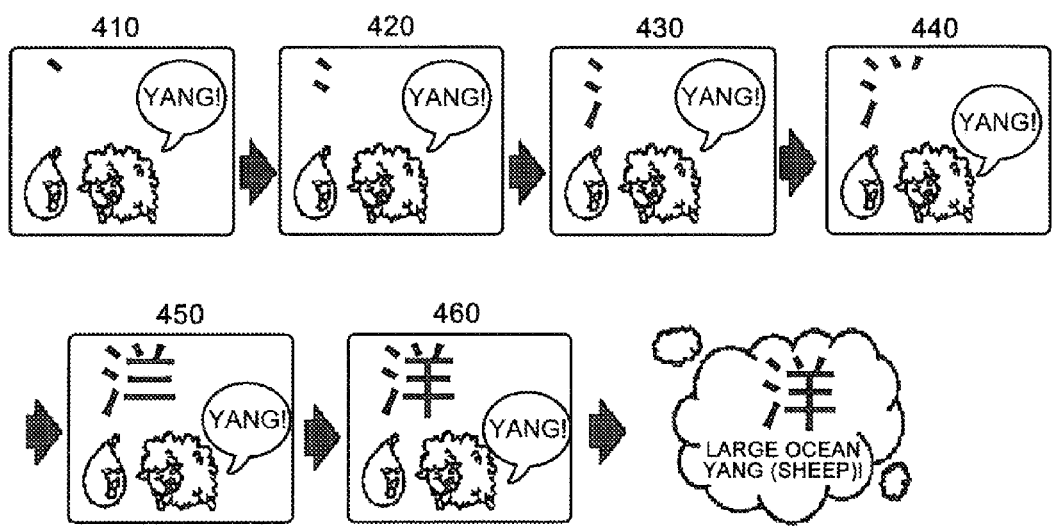
FIG. 5 illustrates a method for operating combined characters in the Chinese character learning game according to a second embodiment of the present invention.

In another embodiment, a Chinese character is displayed in the order of making strokes according to the degree of impact of an attack received from an opponent during a game. The total number of strokes of a Chinese character indicates a physical strength, and the degree of physical strength reduced is changed depending on the strong/weak of an opponent's attack. Therefore, two or three strokes of the Chinese character may be displayed at a time. When the graphic character 110 of the '洋' (large ocean yang (sheep)) 100 composed of nine strokes receives an attack, the degree of physical strength reduced is displayed as a degree of strokes of the combined character. When all the physical strength of the graphic character 110 is reduced due to continuous attacks, the complete form, pronunciation and meaning of the '洋' (large ocean yang (sheep)) 100 are all displayed, and the '洋' (large ocean yang (sheep)) 100 is disappeared while shouting 'large ocean yang (sheep)' (FIG. 5).

Figure 6:
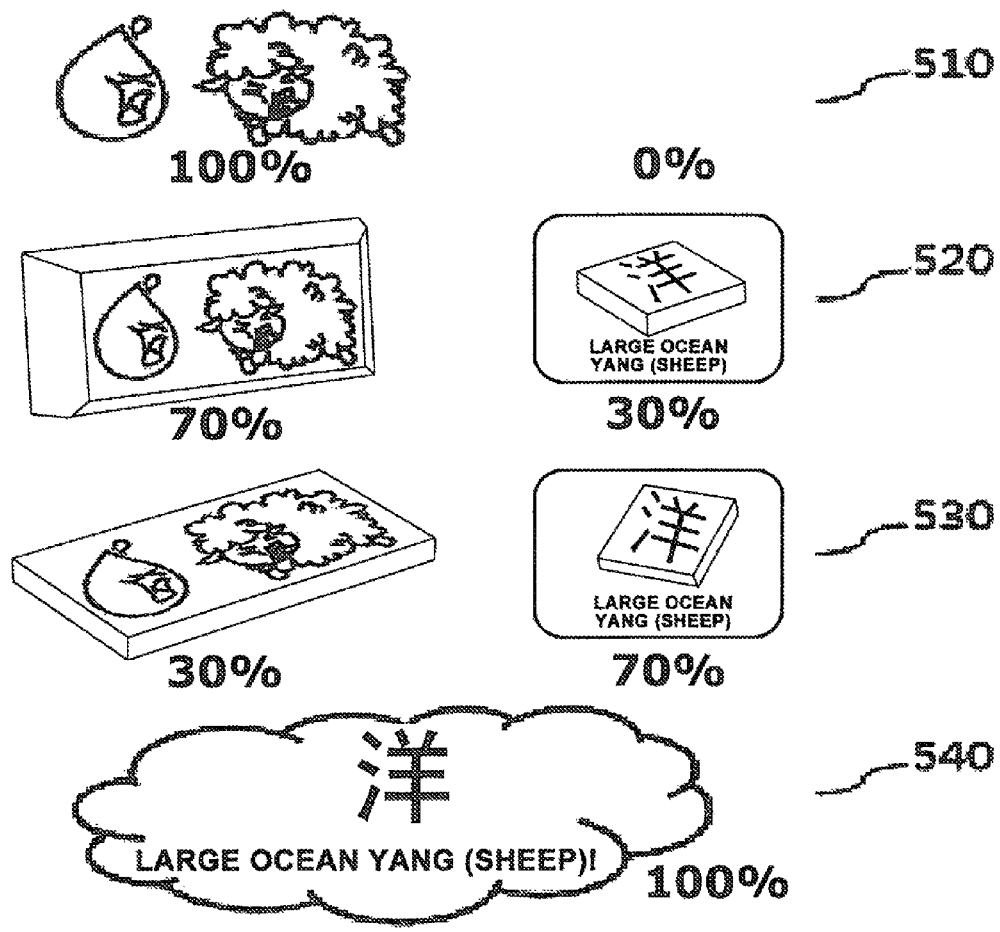
FIG. 6 illustrates a method for operating combined characters in the Chinese character learning game according to a third embodiment of the present invention.

In still another embodiment, when a graphic character of a combined character receives an attack from an opponent, the graphic character gradually becomes dim, and on the contrary, the corresponding combined character and its pronunciation and meaning gradually become clear. When the physical strength of the graphic character is 100%, only the graphic character is displayed. When the physical strength of the graphic character is 70%, the graphic character is clearly displayed to a degree of about 70%, and the corresponding combined character is dimly displayed to a degree of about 30%. When the physical strength of the graphic character is 30%, the graphic character is dimly displayed to a degree of about 30%, and the corresponding combined character is clearly displayed to a degree of about 70%. When the physical strength of the graphic character is 0%, i.e., is completely reduced, the graphic character is disappeared, and only the corresponding combined character is clearly displayed while shouting 'large ocean yang (sheep)' (FIG. 6). Accordingly, as a graphic character of a combined character gradually receives an attack, the visual rate of the graphic character is decreased, and the visual rate of the corresponding combined character is increased.

In still another embodiment, when the physical strength of a graphic character of a combined character is initially 100%, the entire frame is configured with only graphic characters. That is, in FIG. 7(a), ten images are all displayed as lamp figures. However, when the physical strength of the graphic character of the combined character is 70%, sheep figures in the entire frame, corresponding to about 30% of the ten images, are replaced with the corresponding characters. That is, in FIG. 7(b), three of the ten images, positioned between the images, are replaced with the corresponding combined characters. When the physical strength of the graphic character of the combined character is 30%, sheep figures in the entire frame, corresponding to about 70% of the ten images, are replaced with the corresponding characters. That is, in FIG. 7(c), seven of the ten images, positioned between the images, are replaced with the corresponding combined characters. Accordingly, as the graphic character continuously receives attacks, the occupancy ratio of the corresponding combined character to the graphic character is increased. As such, if the graphic character and the corresponding combined character are alternately displayed at a certain rate, the graphic character and the corresponding combined character are alternately flickered whenever the graphic character receives an attack. Thus, the association strength of the corresponding combined character is increased from the graphic character. When the physical strength of the graphic character of the combined character is 50%, the graphic character is most frequently flickered. When the physical strength of the graphic character of the combined character is 0% (FIG. 7(d)) and when the physical strength of the graphic character of the combined character is 100% (FIG. 7(a)), there is no flickering.

Although the present invention has been described in connection with the accompanying drawings and the preferred embodiments, the present invention is not limited thereto but defined by the appended claims. Accordingly, it will be understood by those skilled in the art that various modifications and changes can be made thereto without departing from the spirit and scope of the invention defined by the appended claims.

INDUSTRIAL APPLICABILITY

According to the present invention, a graphic character of a combined character can be effectively created in a Chinese character learning game through which a user learns Chinese characters, thereby more efficiently performing Chinese character learning.

The invention claimed is:
1. A method for creating combined characters a graphic character of a combined character in a Chinese character learning game through which a user learns Chinese characters, the combined character including a first portion representing a pronunciation of the combined character and a second portion representing a meaning of the combined character, the method comprising:
   providing a main controller of a learning game server system, wherein the main controller is configured to perform instructions comprising:
      a first step of creating a first graphic character that represents the pronunciation of the combined character and is a graphic image different from the first portion of the combined character, wherein the first graphic character is not a Chinese character;
      a second step of creating a second graphic character that represents the meaning of the combined character and is a graphic image different from the second portion of the combined character, wherein the second graphic character is not a Chinese character; and
      a third step of disposing the second graphic character representing the meaning and the first graphic character representing the pronunciation according to the positional relationship between the first portion of the combined character and the second portion of the combined character,
   wherein the graphic character of the combined character is formed by combining the first and second graphic characters.

2. The method according to claim 1, wherein the second graphic character representing the meaning and the first graphic character representing the pronunciation are distinguished from each other using a current state, size, number or color.

3. The method according to claim 2, wherein the current state is divided into a state in which the second graphic character representing the meaning is sleeping with closed eyes and a state in which the first graphic character representing the pronunciation is awake with open eyes.

4. The method according to claim 1, wherein, when the graphic character of the combined character makes an attack to an opponent during a game, the first graphic character representing the pronunciation is displayed as a subject of the attack, and the second graphic character representing the meaning is displayed as an attribute of the attack.

5. The method according to claim 4, wherein the first graphic character that is the subject of the attack is configured to shout the meaning of the combined character in the attack.

6. The method according to claim 1, wherein, when the graphic character of the combined character receives an attack from an opponent during a game, the first graphic character representing the pronunciation is configured to shout the pronunciation of the corresponding combined character.

7. The method according to claim 6, wherein the total number of strokes of the combined character is displayed as a physical strength of the graphic character of the combined character, and the combined character is displayed in the order of the strokes of the combined character according to the degree of impact of the attack received from the opponent.

8. The method according to claim 7, wherein, when the entire physical strength of the graphic character of the combined character is reduced, the combined character is completely displayed.

9. The method according to claim 6, wherein, as the physical strength of the graphic character of the combined character is reduced, the graphic character gradually becomes dim and the corresponding combined character and its pronunciation and meaning gradually become clear, and a change in physical strength is displayed by indicating the physical strength of the graphic character as a gauge.

10. The method according to claim 6, wherein, when the graphic character of the combined character receives an attack, the graphic character and the corresponding combined character are alternately displayed according to the degree of physical strength of the graphic character.

11. A non-transitory computer-readable recording medium in which a program for creating combined characters a graphic character of a combined character in a Chinese character learning game through which a user learns Chinese characters, the combined character including a first portion representing a pronunciation of the combined character and a second portion representing a meaning of the combined character, the computer-readable medium comprising:
- a first step of creating a first graphic character that represents the pronunciation of the combined character and is a graphic image different from the first portion of the combined character, wherein the first graphic character is not a Chinese character;
- a second step of creating a second graphic character that represents the meaning of the combined character and is a graphic image different from the second portion of the combined character, wherein the second graphic character is not a Chinese character; and
- a third step of disposing the second graphic character representing the meaning and the first graphic character representing the pronunciation according to the positional relationship between the first portion of the combined character and the second portion of the combined character,
- wherein the graphic character of the combined character is formed by combining the first and second graphic characters.

12. The computer-readable recording medium according to claim 11, wherein the second graphic character representing the meaning and the first graphic character representing the pronunciation are distinguished from each other using a current state, size, number or color.

13. The computer-readable recording medium according to claim 12, wherein the current state is divided into a state in which the second graphic character representing the meaning is sleeping with closed eyes and a state in which the first graphic character representing the pronunciation is awake with open eyes.

14. The computer-readable recording medium according to claim 11, wherein, when the graphic character of the combined character makes an attack to an opponent during a game, the first graphic character representing the pronunciation is displayed as a subject of the attack, and the second graphic character representing the meaning is displayed as an attribute of the attack.

15. The computer-readable recording medium according to claim 14, wherein the first graphic character that is the subject of the attack is configured to shout the meaning of the combined character in the attack.

16. The computer-readable recording medium according to claim 11, wherein, when the graphic character of the combined character receives an attack from an opponent during a game, the first graphic character representing the pronunciation is configured to shout the pronunciation of the corresponding combined character.

17. The computer-readable recording medium according to claim 16, wherein the total number of strokes of the combined character is displayed as a physical strength of the graphic character of the combined character, and the combined character is displayed in the order of the strokes of the combined character according to the degree of impact of the attack received from the opponent.

18. The computer-readable recording medium according to claim 17, wherein, when the entire physical strength of the graphic character of the combined character is reduced, the combined character is completely displayed.

19. The computer-readable recording medium according to claim 16, wherein, as the physical strength of the graphic character of the combined character is reduced, the graphic character gradually becomes dim and the corresponding combined character and its pronunciation and meaning gradually become clear, and a change in physical strength is displayed by indicating the physical strength of the graphic character as a gauge.

20. The computer-readable recording medium according to claim 16, wherein, when the graphic character of the combined character receives an attack, the graphic character and the corresponding combined character are alternately displayed according to the degree of physical strength of the graphic character.

* * * * *